No. 771,741. PATENTED OCT. 4, 1904.
T. W. McMANUS.
FEED BAG.
APPLICATION FILED APR. 11, 1904.
NO MODEL.

Witnesses
Jas A. Koehl
C. J. Willson

Inventor
Thomas W. McManus
By H. R. Willson
Attorney

No. 771,741.

Patented October 4, 1904.

UNITED STATES PATENT OFFICE.

THOMAS W. McMANUS, OF NEW YORK, N. Y.

FEED-BAG.

SPECIFICATION forming part of Letters Patent No. 771,741, dated October 4, 1904.

Application filed April 11, 1904. Serial No. 202,696. (No model.)

*To all whom it may concern:*

Be it known that I, THOMAS W. MCMANUS, a citizen of the United States, residing at New York, in the county of New York and State of New York, have invented certain new and useful Improvements in Feed-Bags; and I do declare the following to be a full, clear, and exact description of the invention, such as will enable others skilled in the art to which it appertains to make and use the same.

My invention is an improved feed-bag for horses and other animals adapted to automatically keep the food at all times in proper relation to the animal's mouth, so as to enable the animal to readily reach its contents, and also provided with means to prevent the spilling out and wasting of the feed in the event that the animal should raise his head while eating.

My invention consists in the construction, arrangement, and combination of devices hereinafter described and claimed.

Figure 1:
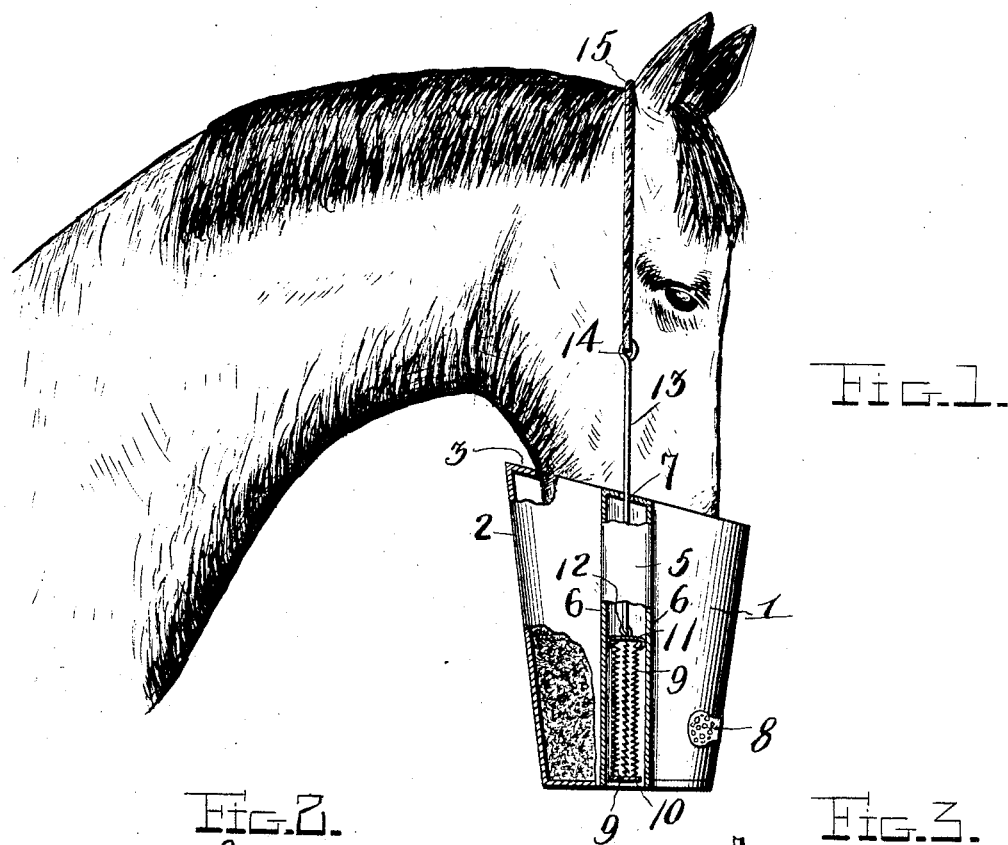
Figure 2:
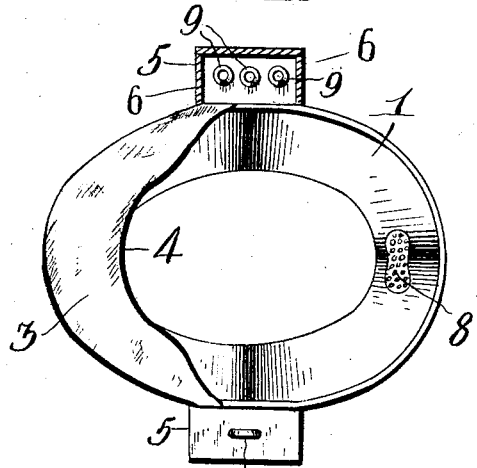
Figure 3:
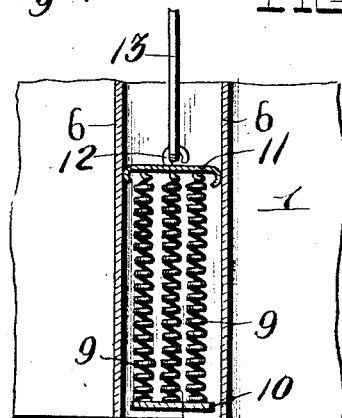

In the accompanying drawings, Figure 1 is a side elevation, partly in section, of a feed-bag embodying my improvements. Fig. 2 is partly a top plan view and partly a section of the same. Fig. 3 is a detail view.

My improved feed-bag 1, which may be made of canvas or any other suitable material, is of the usual inverted truncated conical form, and its rear portion is inclined upwardly and rearwardly, as at 2, and provided with a fabric 3, stretched across the rear upper side of the feed-bag to form a pocket to prevent spilling of the contents of the feed-bag when the animal raises his head. One side of the said fabric 3 is shaped, as at 4, to adapt it to fit snugly against the animal's rear jaw. This fabric is somewhat elastic or yielding to avoid discomfort to the animal and to enable it to fit animals which vary in size.

On opposite sides of the feed-bag are vertical guideways 5, which may be made of leather, heavy canvas, or other comparatively inflexible material. The said guideways are secured on the outer side of the feed-bag and are rectangular in cross-section and provided with sides 6, which bear against the feed-bag. These guideways reinforce the feed-bag and greatly strengthen the same and are closed at their upper ends, their upper ends being provided at their centers with openings 7 of suitable size. The lower ends of the guideways are open to permit the free discharge of feed or dirt that may drop into them. A ventilator 8 is here shown in one side of the feed-bag at a suitable distance from the bottom thereof.

In the guideways and housed thereby are springs 9, which are here shown as coiled extensile springs, a plurality of the said springs being in each of the said guideways. The lower ends of the springs in each guideway are secured to a yoke 10, which is secured to the bottom of the guideway, and the upper ends of the said springs are secured to fender guides or yokes 11, which are adapted to travel vertically in the guideways. The ends of the said fender-yokes project beyond the said springs laterally and are curved to reduce friction between them and the sides of the guideways. These fender yokes or guides serve to prevent the springs from coming in contact with the guideways or with the sides of the feed-bag and prevent them from wearing the said guides or the fabric of which the feed-bag is composed. Each of the said fender yokes or guides is provided with an eye 12 for the attachment of the lower end of a rod, rope, or strap 13. Said rods, ropes, or straps are provided at their upper ends with eyes 14, to which are attached the ends of a head strap, cord, or rope 15. The same is detachable from the eye of one of the said rods and may be adjusted any length, so as to suspend the feed-bag initially at any desired height with reference to the head of the animal.

The weight of the feed in the bag causes the springs to extend, so as to bring the upper surface of the feed just within reach of the animal and prevent his muzzle from being buried therein. As the feed is consumed the springs contract, and hence serve to raise the bag, so that the feed is at all times kept within reach of the animal until it is entirely consumed. No adjustment whatever is required after the feed-bag has been once properly suspended from the animal's head. Should the animal raise his head, as when he is annoyed by a fly or for any other reason, the fabric 3 and the pocket formed thereby at the rear upper side of the feed-bag prevent any of the feed from being spilled out.

Rubber or any other suitable form of springs may be employed within the scope of my invention, and any suitable number of the springs may be employed.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

A feed-bag having relatively inflexible guideways at its sides, a plurality of springs in each of said guideways, secured at their lower ends, and fender-guides adapted to travel vertically in said guideways and each secured to the upper ends of one of the groups of springs, said fender-guides projecting laterally beyond the springs to prevent the latter from coming in contact with the sides of the guideways, having said projecting portions turned and curved to reduce friction between them and the guideways and being further provided with means for the attachment of supporting devices thereto, substantially as described.

In testimony whereof I have hereunto set my hand in presence of two subscribing witnesses.

THOMAS W. McMANUS.

Witnesses:
 ALBERT C. METRAL,
 NICHOLAS P. McMANUS.